United States Patent
Ejima et al.

(10) Patent No.: US 9,838,113 B2
(45) Date of Patent: Dec. 5, 2017

(54) OPTICAL WAVELENGTH MULTIPLEXING DEVICE, OPTICAL TRANSMISSION DEVICE, AND ABNORMALITY DETERMINATION METHOD

(71) Applicant: FUJITSU LIMITED, Kawasaki-shi, Kanagawa (JP)

(72) Inventors: Kota Ejima, Fukuoka (JP); Masahiro Yamakami, Fukuoka (JP); Satoshi Yoshimura, Fukuoka (JP); Takumi Tochigi, Fukuoka (JP); Makoto Yoshimi, Kasuga (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/079,006

(22) Filed: Mar. 23, 2016

(65) Prior Publication Data
US 2016/0308608 A1  Oct. 20, 2016

(30) Foreign Application Priority Data
Apr. 15, 2015  (JP) .................... 2015-083760

(51) Int. Cl.
*H04B 10/079* (2013.01)
*H04J 14/02* (2006.01)

(52) U.S. Cl.
CPC ..... *H04B 10/0791* (2013.01); *H04B 10/0795* (2013.01); *H04J 14/0212* (2013.01); *H04J 14/0283* (2013.01)

(58) Field of Classification Search
CPC ............. H04B 10/0791; H04B 10/0795; H04J 14/0212
See application file for complete search history.

(56) References Cited

U.S. PATENT DOCUMENTS

| | | | |
|---|---|---|---|
| 2006/0018658 A1* | 1/2006 | Mori | H04J 14/0221 398/79 |
| 2006/0215955 A1* | 9/2006 | Mitamura | G02B 6/2931 385/18 |
| 2008/0050065 A1 | 2/2008 | Sakai et al. | |
| 2013/0315583 A1* | 11/2013 | Komiya | H04B 10/075 398/19 |

(Continued)

FOREIGN PATENT DOCUMENTS

| | | |
|---|---|---|
| JP | 2006-267522 | 10/2006 |
| JP | 2008-052211 | 3/2008 |

*Primary Examiner* — Dzung Tran
(74) *Attorney, Agent, or Firm* — Fujitsu Patent Center (57) ABSTRACT

An optical wavelength multiplexing device includes: a wavelength selective switch including a first input port for receiving an optical signal, a second input port for receiving a monitoring signal, output ports for outputting the optical signal or the monitoring signal, and an adjustment unit that adjusts a level of the optical signal or the monitoring signal at one of the output ports; a measurement unit that measures an output level of the monitoring signal at one of the output ports; and a control unit that specifies an unused output port of the output ports as a monitoring target port; sets a specific adjustment amount to the monitoring target port; outputs the monitoring signal to the monitoring target port; and determines whether the monitoring target port has an abnormality, based on the output level at the monitoring target port and an estimated output level at the monitoring target port.

14 Claims, 6 Drawing Sheets

(56) References Cited

U.S. PATENT DOCUMENTS

2014/0126905 A1* 5/2014 Yonenaga ............ H04B 10/506
398/48
2015/0135319 A1* 5/2015 Costantini ........... H04J 14/0227
726/23

* cited by examiner

OPTICAL WAVELENGTH MULTIPLEXING DEVICE, OPTICAL TRANSMISSION DEVICE, AND ABNORMALITY DETERMINATION METHOD

CROSS-REFERENCE TO RELATED APPLICATION

This application is based upon and claims the benefit of priority of the prior Japanese Patent Application No. 2015-083760, filed on Apr. 15, 2015, the entire contents of which are incorporated herein by reference.

FIELD

The embodiments discussed herein are related to an optical wavelength multiplexing device, an optical transmission device, and an abnormality determination method.

BACKGROUND

In an optical wavelength division multiplexing (WDM) transmission system, a plurality of optical transmission devices are coupled, and an optical wavelength multiplexed signal obtained by multiplexing optical signals having different optical wavelengths is transmitted between the optical transmission devices.

A technology in a related art is discussed in Japanese Laid-open Patent Publication No. 2006-267522.

SUMMARY

According to an aspect of the embodiments, an optical wavelength multiplexing device includes: a wavelength selective switch that includes a first input port through which an optical signal is input, a second input port through which a monitoring signal corresponding to a monitoring optical signal is input, a plurality of output ports through which the optical signal or the monitoring signal is output, and an adjustment unit that adjusts a level of the optical signal or the monitoring signal output to one of the plurality of output ports; a measurement unit that measures an output level of the monitoring signal at one of the plurality of output ports; and a control unit that controls the wavelength selective switch and the measurement unit; wherein the control unit: specifies an unused output port from among the plurality of output ports as a monitoring target port; sets an adjustment amount of the monitoring target port at a specific adjustment amount; outputs the monitoring signal to the monitoring target port; and determines whether the monitoring target port has an abnormality, based on the output level of the monitoring signal at the monitoring target port, which is measured by the measurement unit, and an estimated output level of the monitoring signal at the monitoring target port when the specific adjustment amount is set.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Each of the optical transmission devices includes a WSS that optically drops or adds an optical signal having a certain optical wavelength from or to the optical wavelength multiplexed signal.

A monitoring signal generated at an internal light source is output from a monitoring signal input port to a monitoring signal output port in the WSS, and the intensity of the monitoring signal, for example, the output level of the monitoring signal is monitored to check the normality of the WSS. Feedback control of the angle of the reflection surface of a corresponding mirror is performed based on the output level of the monitoring signal so that the output level of the monitoring signal having an optical wavelength that is not used for the operation becomes maximum from among optical signals of the optical wavelength multiplexed signal. As described above, the normality of the WSS is checked using the monitoring signal having the unused optical wavelength.

For example, the optical transmission device checks the normality of the WSS using a monitoring signal having an unused optical wavelength, but may not check the normality of a port that is not used for the operation. For example, the performance of a port of the WSS may be reduced due to a factor such as a change over time. As a result, in a case in which an unused port has an abnormality when the unused port is used for the operation, a high-quality line guarantee may not be secured at the time of start of the operation in the optical transmission device because the normality of the unused port is not checked. There may be provided that an optical transmission device that checks the normality of an unused port of the WSS, for example, predicts the abnormality in the unused port.

The technology discussed herein is not limited to embodiments described below. The embodiments may be combined as appropriate.

Figure 1:
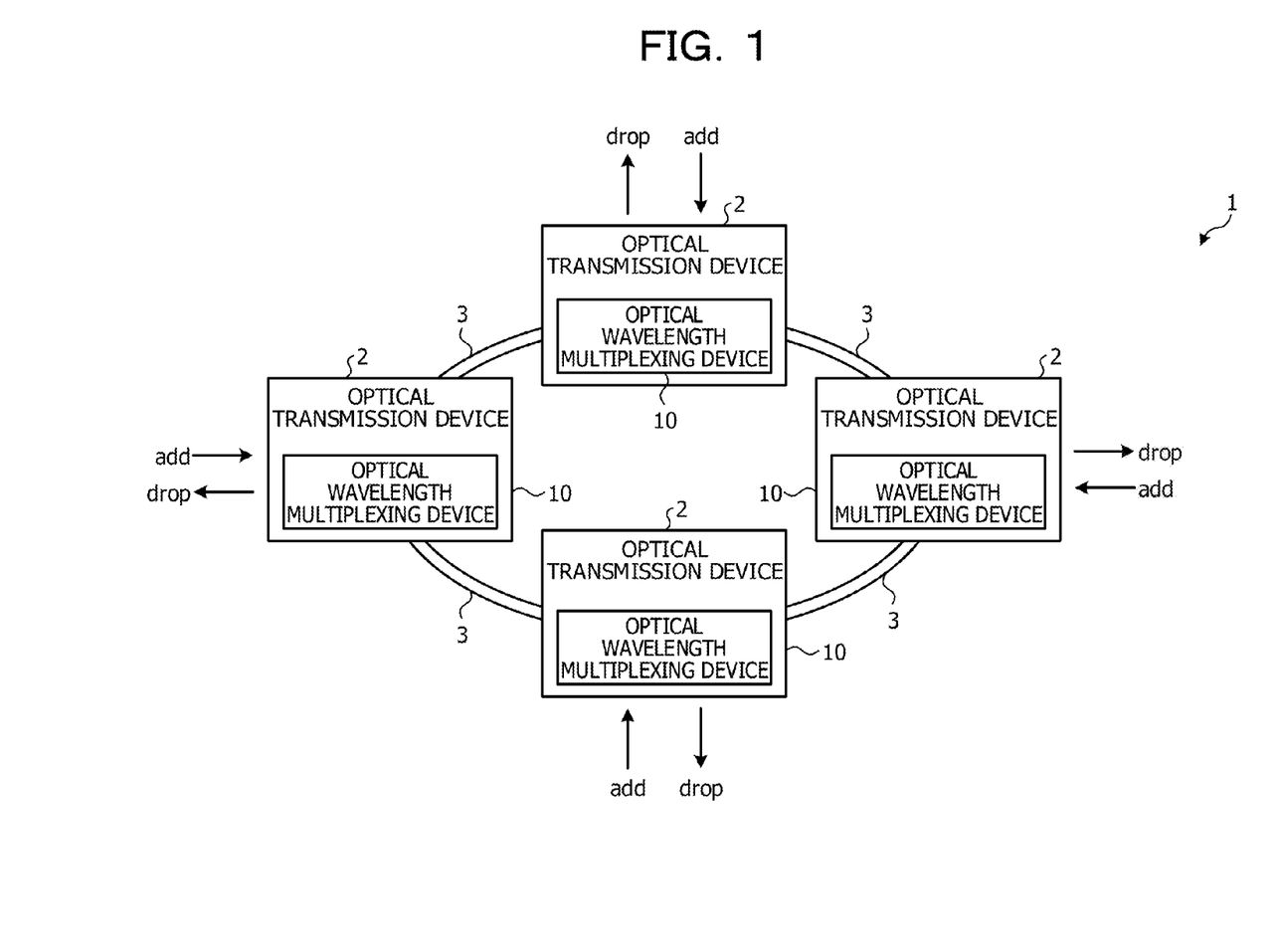
FIG. 1 is a diagram illustrating an exemplary optical transmission system.

FIG. 1 is a diagram illustrating an exemplary optical transmission system. In an optical transmission system 1 illustrated in FIG. 1, a plurality of optical transmission devices 2 are coupled through optical fibers 3, and each of the optical transmission devices 2 transmits, through the optical fiber 3, an optical wavelength multiplexed signal of a WDM scheme, which is obtained by multiplexing optical signals having different optical wavelengths. The optical transmission device 2 includes, for example, an optical wavelength multiplexing device 10 such as a reconfigurable optical add/drop multiplexer (ROADM) that optically drops or adds an optical signal having a certain wavelength from or to the optical wavelength multiplexed signal.

Figure 2:
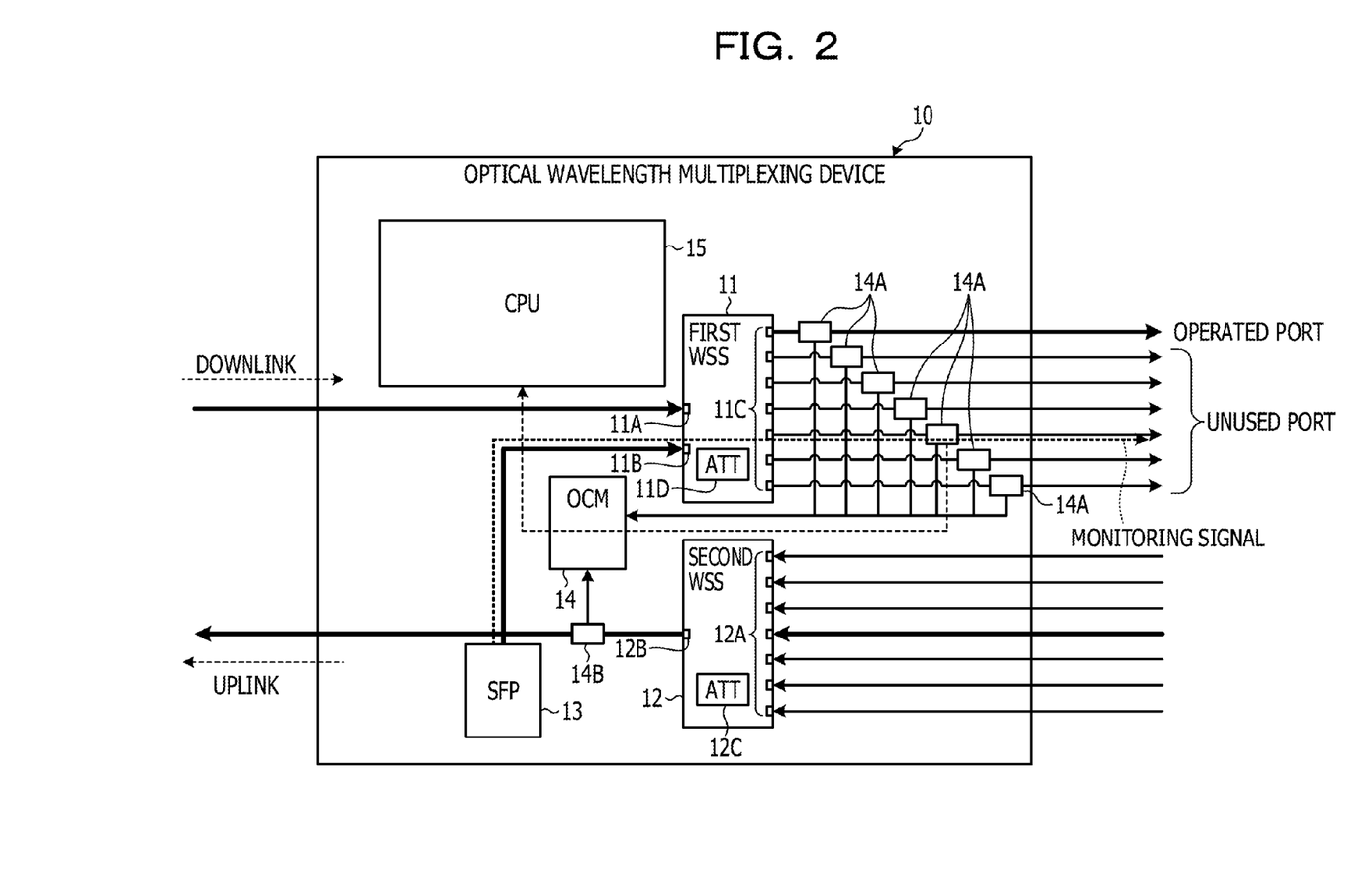
FIG. 2 is a diagram illustrating an exemplary optical wavelength multiplexing device.

FIG. 2 is a diagram illustrating an exemplary optical wavelength multiplexing device. The optical wavelength multiplexing device 10 illustrated in FIG. 2 includes a first WSS 11, a second WSS 12, a small form-factor pluggable (SFP) 13, an optical channel monitor (OCM) 14, and a CPU 15. The first WSS 11 includes a single first input port 11A, a single second input port 11B, and M output ports 11C. The first WSS 11 outputs an optical signal input through the first input port 11A or the second input port 11B, to each of the output ports 11C in a unit of an optical wavelength. The first input port 11A is an input port for inputting an optical signal such as an optical wavelength multiplexed signal from a downlink. The second input port 11B is an input port through which a monitoring signal having an optical wavelength different from the optical wavelength multiplexed signal is input.

The SFP 13 is a signal source that outputs a monitoring signal. The second WSS 12 includes, for example, N input ports 12A and a single output port 12B, and optically combines optical signals from the input ports 12A, and outputs the combined optical signal to the output port 12B. The OCM 14 is coupled to first optical dividing units 14A and a second optical dividing unit 14B. The first optical dividing unit 14A is arranged for each of the output ports 11C of the first WSS 11, and optically divides a signal output through the output port 11C. The second optical dividing unit 14B is arranged for the output port 12B of the second WSS 12, and optically divides a signal output through the output port 12B for the uplink and the OCM 14. The OCM 14 may be, for example, an optical spectrum analyzer that monitors the output levels of the optical wavelengths at the output ports 11C of the first WSS 11, based on the output signals that have been optically divided by the first optical dividing units 14A, respectively. The output level may be an output power level for each of the optical wavelengths. The OCM 14 monitors the output level of the output port 12B of the second WSS 12, based on the output signal that has been optically divided by the second optical dividing unit 14B.

The first WSS 11 includes an attenuator (AU) 11D that adjusts the output level of the optical signal having each of the optical wavelengths from the first input port 11A or the second input port 11B. The second WSS 12 includes an ATT 12C that adjusts the output level of the optical signal having each of the optical wavelengths from the plurality of input ports 12A. The CPU 15 controls the entire optical wavelength multiplexing device 10.

Figure 3:
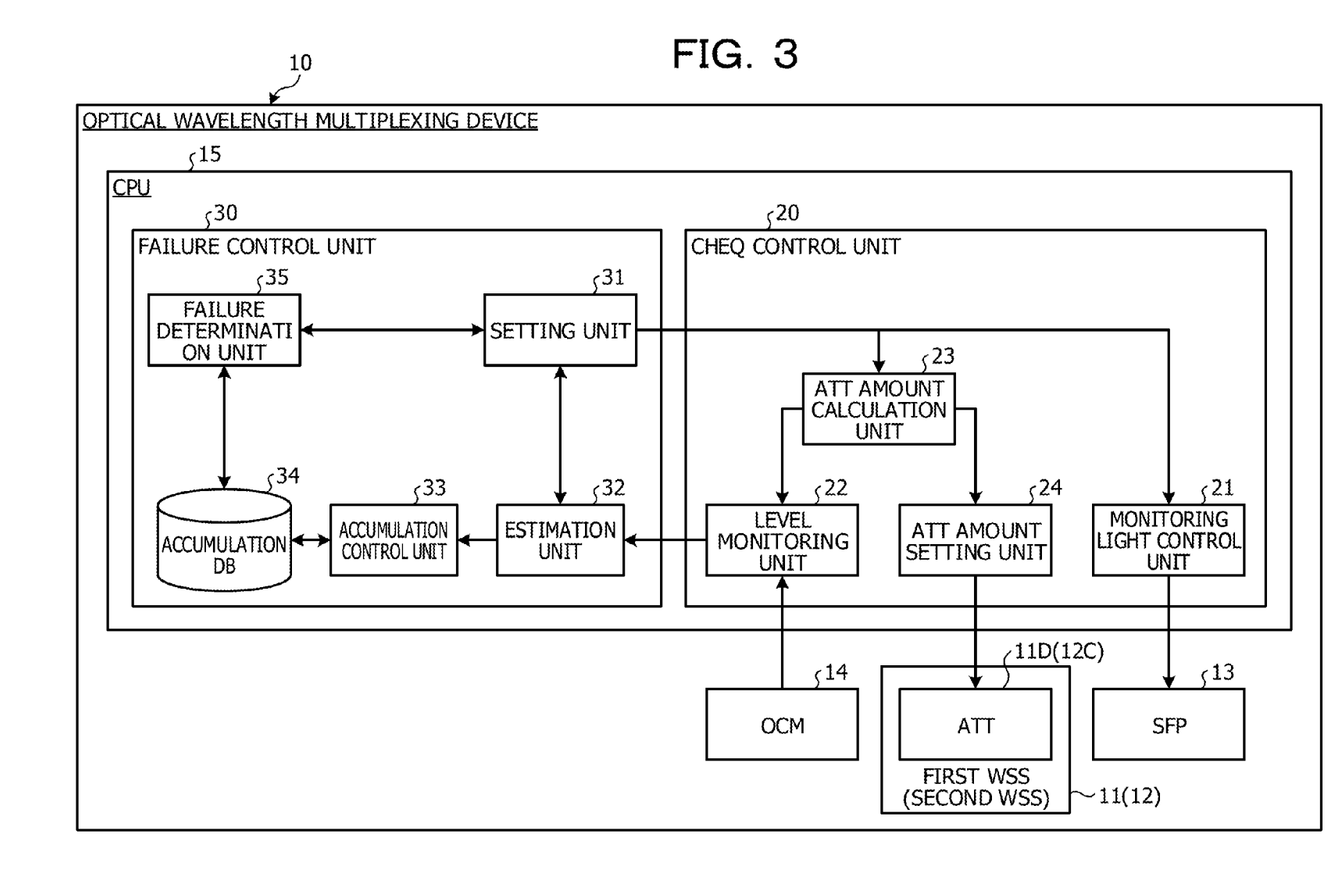
FIG. 3 is a diagram illustrating an exemplary function configuration of a central processing unit (CPU) of the optical wavelength multiplexing device.

FIG. 3 is diagram illustrating an exemplary function configuration of the CPU of the optical wavelength multiplexing device. The CPU 15 illustrated in FIG. 3 includes a channel equalizer (CHEQ) control unit 20 and a failure control unit 30. The CHEQ control unit 20 controls the ATT 11D of the first WSS 11 and the ATT 12C of the second WSS 12, based on the monitoring result of the OCM 14. The CHEQ control unit 20 includes a monitoring light control unit 21, a level monitoring unit 22, an ATT amount calculation unit 23, and an ATT amount setting unit 24. The failure control unit 30 estimates a failure in the first WSS 11.

The first WSS 11 receives an operating optical signal, from the first input port 11A, and outputs the received operating optical signal through an operated output port 11C from among the plurality of output ports 11C. The first WSS 11 receives a monitoring signal from the second input port 11B, and outputs the received monitoring signal through an unused output port 11C from among the plurality of output ports 11C. The unused output port 11C is an output port 11C that is not used for the operation from among the plurality of output ports 11C.

The monitoring light control unit 21 controls the SFP 13 that outputs a monitoring signal. The level monitoring unit 22 monitors the output level of each of the optical wavelengths at the output ports 11C of the first WSS 11, through the OCM 14, and monitors the input level of the monitoring signal input to the first WSS 11, through the OCM 14. The level monitoring unit 22 monitors the output level of each of the optical wavelengths at the output port 12B of the second WSS 12, through the OCM 14. The ATT amount calculation unit 23 calculates an ATT amount set to the ATT 11D of the first WSS 11 so that the output level of each of the optical wavelengths at the operated output ports 11C, which has been monitored by the level monitoring unit 22, becomes a target output level. The ATT amount calculation unit 23 calculates an ATT amount set to the ATT 12C of the second WSS 12 so that the output level of each of the optical wavelengths at the operated output port 12B, which has been monitored by the level monitoring unit 22, becomes a target output level. The ATT amount setting unit 24 sets the ATT amount that has been calculated in the ATT amount calculation unit 23, to the ATT 11D of the first WSS 11 or the ATT 12C of the second WSS 12. For example, the CHEQ control unit 20 performs feedback control by adjusting the ATT amount so that the output level of each of the optical wavelengths of the output ports, which has been monitored by the level monitoring unit 22, becomes the target output level.

The failure control unit 30 includes a setting unit 31, an estimation unit 32, an accumulation control unit 33, an accumulation database (DB) 34, and a failure determination unit 35. The setting unit 31 starts monitoring processing at certain intervals. The monitoring processing is processing in which the state of a monitoring target port of the first WSS 11 is monitored. The setting unit 31 specifies an unused output port 11C from among the plurality of output ports 11C in the first WSS 11 as a monitoring target port, and sets the ATT amount of the specified monitoring target port at a certain ATT amount. The setting unit 31 may sequentially specify merely an unused output port 11C from among the plurality of output ports 11C of the first WSS 11 as the monitoring target port, and may not specify the operated output port 11C. After the setting unit 31 has set the ATT amount of the monitoring target port at the certain ATT amount, the setting unit 31 outputs a monitoring signal from the SFP 13 to the monitoring target port through the monitoring light control unit 21.

The estimation unit 32 calculates an estimated output level of the monitoring signal at the monitoring target port, based on the input level of the monitoring signal at the second input port 11B of the first WSS 11 and the certain ATT amount that has been set to the ATT 11D of the monitoring target port. The estimated output level is the output level at the monitoring target port, which has been calculated from the input level of the monitoring signal and the certain ATT amount. The estimation unit 32 calculates a control error between the output level of the monitoring signal at the monitoring target port, which has been monitored by the level monitoring unit 22, and the calculated estimated output level of the monitoring signal at the monitoring target port. The control error is a difference between the monitored output level of the monitoring signal and the estimated output level.

The accumulation control unit 33 controls the accumulation of the accumulation DB 34. The accumulation control unit 33 accumulates the port number of the monitoring target port, the control error of the monitoring target port, and the calculated time at which the estimated output level at the monitoring target port has been calculated, in the accumulation DB 34, as history information.

The failure determination unit 35 determines whether the control error exceeds a certain threshold value, for each of the port numbers of the monitoring target ports, with reference to the accumulation DB 34. The certain threshold value may be a threshold value used to estimate that the control error is caused by an abnormality in the port. The failure determination unit 35 determines an abnormality in the monitoring target port corresponding to the port number when the control error exceeds the certain threshold value for each of the port numbers, associates the port number with the control error, and accumulates the port number and the control error in the accumulation DB 34 as the abnormality.

The failure determination unit 35 determines whether a time period in which the abnormality in the monitoring target port has continued exceeds a certain time period, with reference to the accumulation DB 34. The certain time period may be, for example, three days. When the time period in which the abnormality in the monitoring target port has continued exceeds three days, the failure determination unit 35 determines a failure in the first WSS 11. When the failure in the first WSS 11 has been determined, the failure determination unit 35 may output a failure alarm to a monitoring terminal in the optical transmission system 1. The user of the monitoring terminal may recognize the failure in the first WSS 11 of the optical wavelength multiplexing device 10, through the failure alarm. The failure determination unit 35 may cause an indicator light of the optical wavelength multiplexing device 10 to perform blinking in response to the failure alarm in addition to the output of the failure alarm to the monitoring terminal. The user of the optical transmission device 2 may recognize the failure in the first WSS 11 through the blinking of the indicator light.

Figure 4:
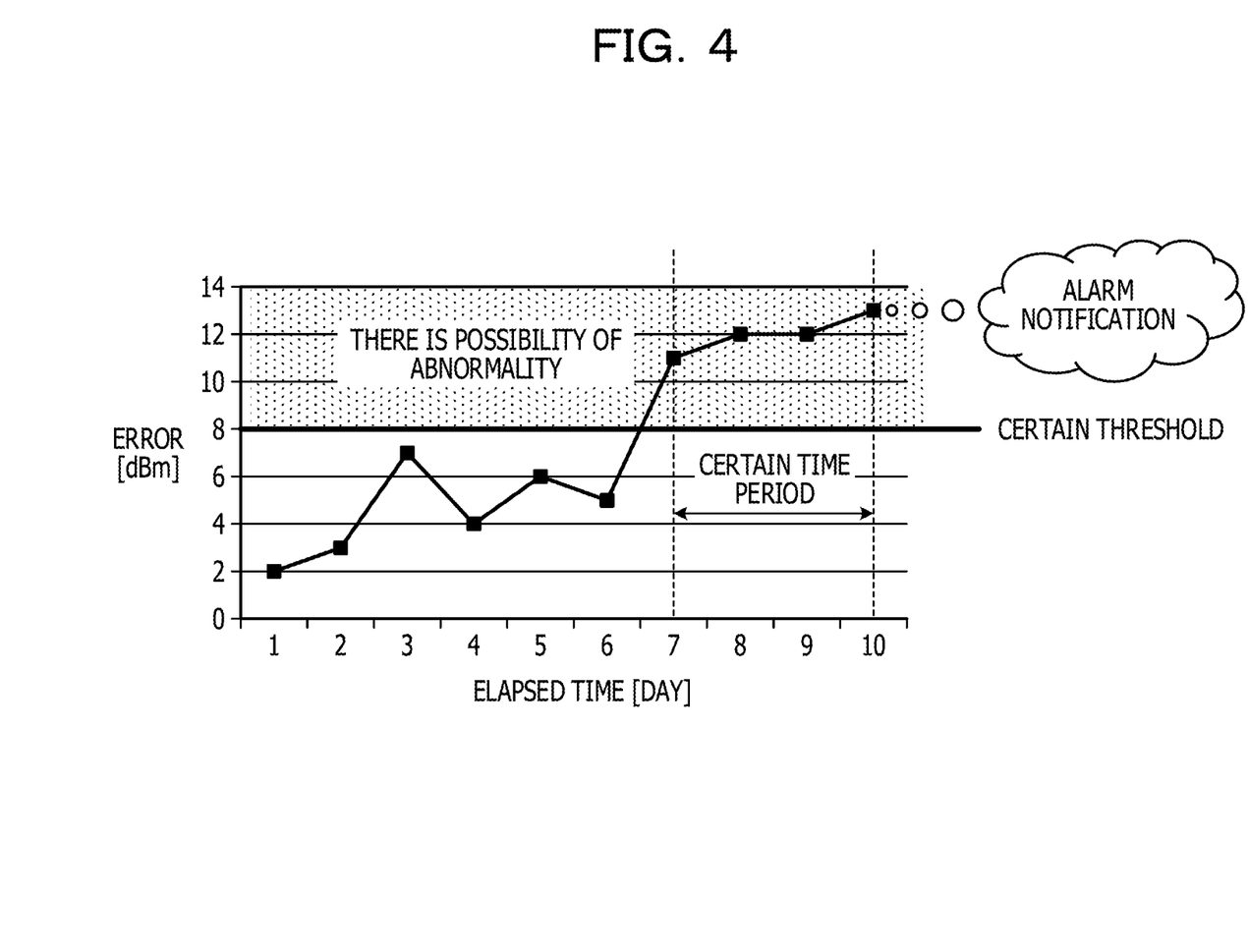
FIG. 4 is a diagram illustrating an exemplary failure determination in a wavelength selective switch (WSS)

FIG. 4 is a diagram illustrating an exemplary failure determination of a WSS. In FIG. 4, the failure determination of a WSS is performed using a control error based on a relationship between the control error and an elapsed time. For convenience of explanation, monitoring of a monitoring target port is performed, for example, at the same time everyday. The control error in the elapsed time from the first to the sixth days illustrated in FIG. 4 does not exceed a certain threshold value, which determines the normality of the monitoring target port. The control error in the elapsed time of the seventh and more days exceeds the certain threshold value, which determines an abnormality in the monitoring target port. In the elapsed time from the seventh to the ten days, the time period in which the abnormality in the monitoring target port has continued exceeds the certain time period, for example, three days, so that there is a high probability of the abnormality in the monitoring target port, and a failure in the first WSS 11 may be determined.

Figure 5:
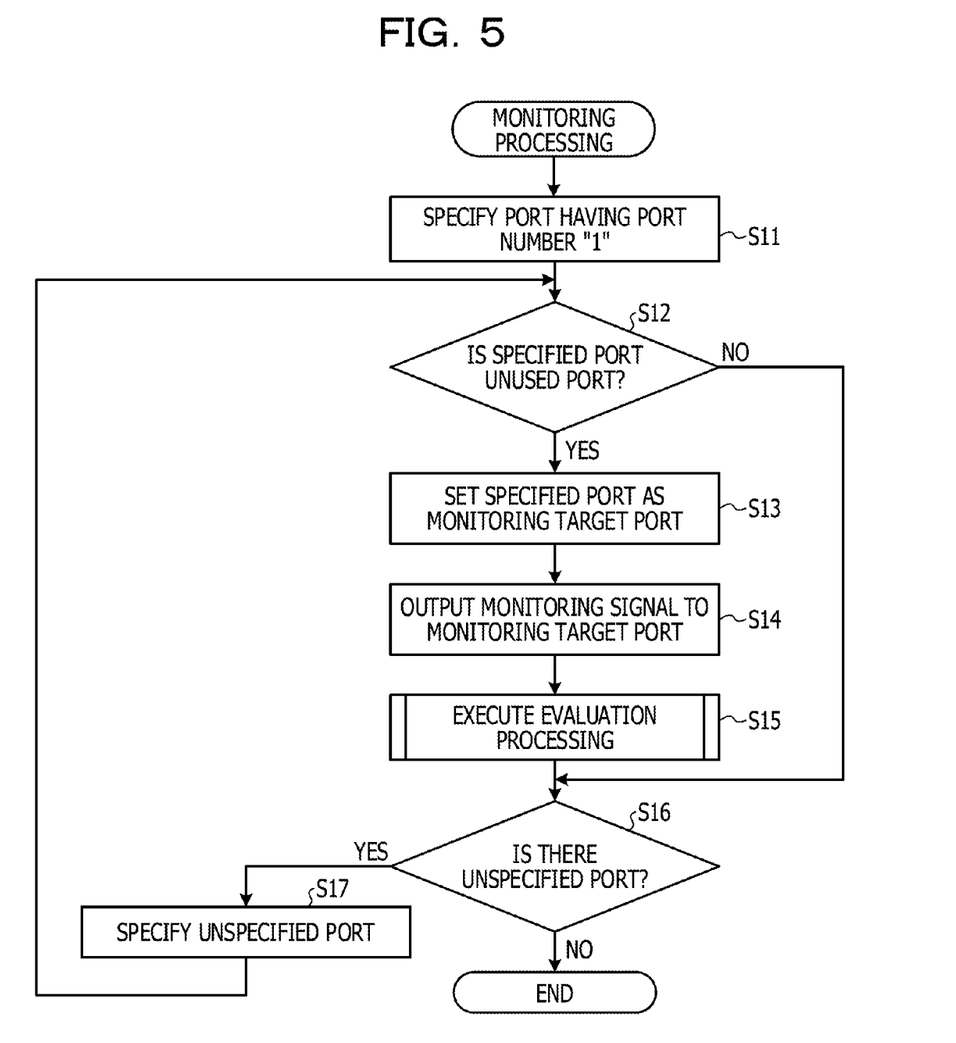
FIG. 5 is a diagram illustrating an exemplary monitoring processing of the optical wavelength multiplexing device.
Figure 6:
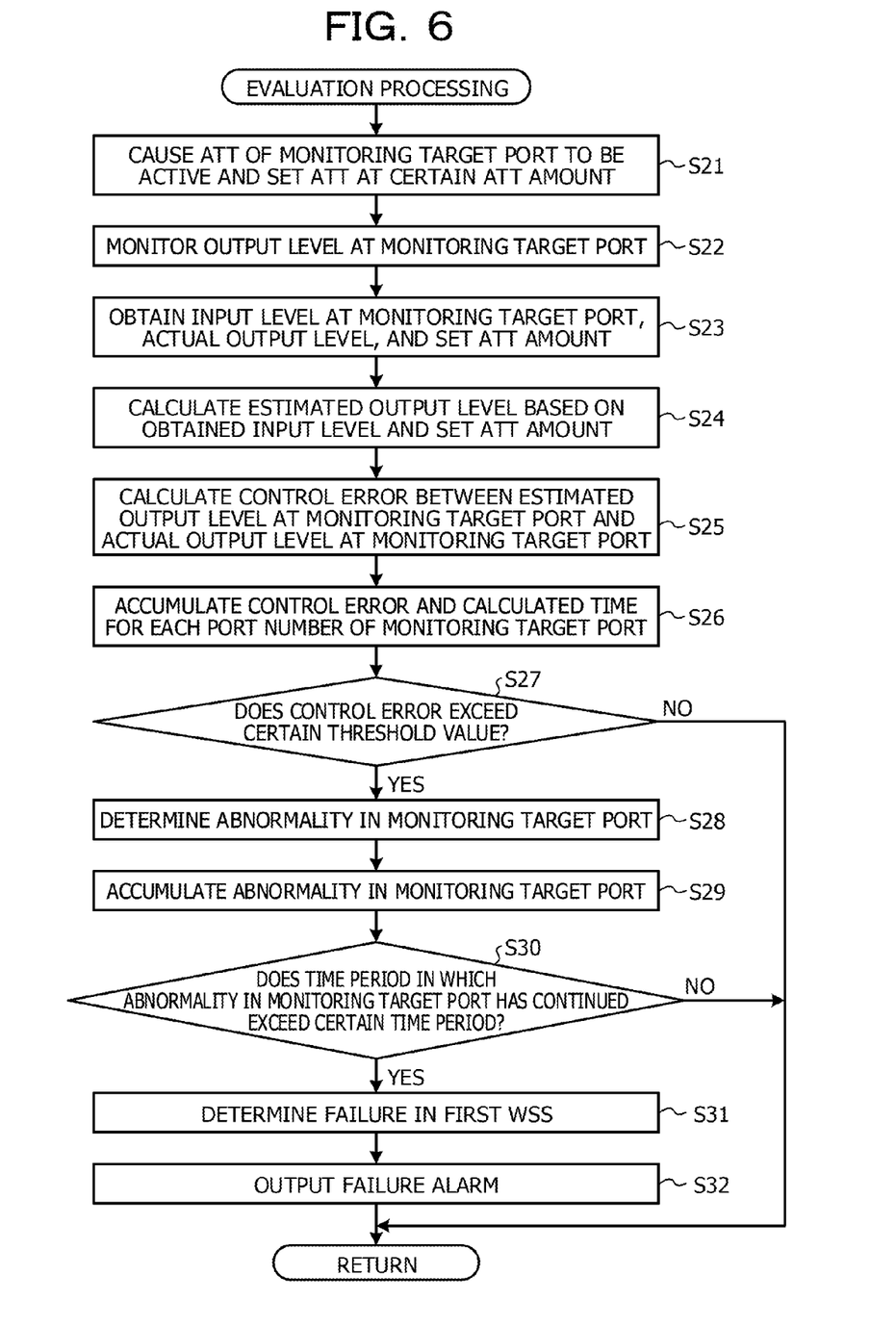
FIG. 6 is a diagram illustrating an exemplary evaluation processing of the optical wavelength multiplexing device.

FIG. 5 is a diagram illustrating an exemplary monitoring processing of the optical wavelength multiplexing device. FIG. 6 is a diagram illustrating an exemplary evaluation processing of the optical wavelength multiplexing device. FIG. 5 illustrates an exemplary processing operation of the CPU 15 in the monitoring processing of the optical wavelength multiplexing device 10 illustrated in FIGS. 2 and 3. In the monitoring processing illustrated in FIG. 5, an unused port from among the plurality of output ports 11C of the first WSS 11 is monitored as a monitoring target port. The monitoring processing may be executed at certain intervals, for example, at the same time everyday.

In FIG. 5, the setting unit 31 in the CPU 15 specifies an output port having a port number "1", from among the plurality of output ports 11C of the first WSS 11 (Operation S11). The output ports 11C are identified, for example, between port numbers "1" to "M".

The setting unit 31 determines whether the specified port is an unused port (Operation S12). When the specified port is an unused port (Yes in Operation S12), the setting unit 31 sets the specified port as a monitoring target port (Operation S13). The setting unit 31 controls the SFP 13 to output a monitoring signal to the monitoring target port, through the monitoring light control unit 21 (Operation S14).

The setting unit 31 executes the evaluation processing illustrated in FIG. 6 for the monitoring target port (Operation S15). After the evaluation processing has been executed for the monitoring target port, the CPU 15 determines whether there is an unspecified port from among the output ports 11C of the first WSS 11 (Operation S16). When there is an unspecified port (Yes in Operation S16), the setting unit 31 specifies the unspecified port (Operation S17). The processing proceeds to Operation S12 to determine whether the specified port is an unused port.

When there is no unspecified port (No in Operation S16), the setting unit 31 ends the processing operation of FIG. 5. When the specified port is not an unused port (No in Operation S12), the processing proceeds to Operation S16 to determine whether there is an unspecified port.

FIG. 6 illustrates an exemplary processing operation of the CPU 15 in the evaluation processing of the optical wavelength multiplexing device 10 illustrated in FIGS. 2 and 3. In the evaluation processing illustrated in FIG. 6, whether there is an abnormality in each of the unused monitoring target ports is determined, and the presence or absence of a failure in the first WSS 11 is evaluated based on the determination result.

In FIG. 6, the setting unit 31 of the CPU 15 causes the ATT 11D of the monitoring target port to become active for the first WSS 11, and sets a certain ATT amount to the ATT 11D, through the ATT amount setting unit 24 (Operation S21). The setting unit 31 monitors the output level of the monitoring signal at the monitoring target port, through the level monitoring unit 22 (Operation S22).

The estimation unit 32 in the CPU 15 obtains the input level of the monitoring signal at the monitoring target port, the output level of the monitoring signal at the monitoring target port, and the certain ATT amount of the first WSS 11, which has been set to the monitoring target port (Operation S23).

The estimation unit 32 calculates an estimated output level at the monitoring target port, based on the input level of the monitoring signal at the monitoring target port and the certain ATT amount that has been set to the monitoring target port (Operation S24). The estimation unit 32 calculates a control error between the output level at the monitoring target port and the estimated output level (Operation S25).

The accumulation control unit 33 in the CPU 15 accumulates the control error of the monitoring target port, which has been calculated in the estimation unit 32 and the calculated time, in the accumulation DB 34 (Operation S26). The calculated time may be a date and time in which the estimated output level at the monitoring target port has been calculated in Operation S24.

The failure determination unit 35 in the CPU 15 determines whether the control error of the monitoring target port exceeds a certain threshold value, with reference to the accumulation DB 34 (Operation S27). When the control error of the monitoring target port exceeds the certain threshold value (Yes in Operation S27), the failure determination unit 35 determines that there is an abnormality in the monitoring target port (Operation S28), associates the port number with the control error, and accumulates the port number and the control error in the accumulation DB 34 as the abnormality (Operation S29).

The failure determination unit 35 determines whether a time period in which the abnormality in the monitoring target port has continued exceeds a certain time period, with reference to the accumulation DB 34 (Operation S30). When the time period in which the abnormality in the monitoring target port has continued exceeds the certain time period (Yes in Operation S30), the failure determination unit 35 determines that there is a high probability of the abnormality in the monitoring target port, and determines that there is a failure in the first WSS 11 (Operation S31). The failure determination unit 35 outputs a failure alarm of the first WSS 11 (Operation S32), and ends the processing operation illustrated in FIG. 6. The failure determination unit 35 outputs the failure alarm of the first WSS 11 to the monitoring terminal. The user of the monitoring terminal may recognize, in advance, the failure in the first WSS 11 of the optical wavelength multiplexing device 10, based on the failure alarm output to the monitoring terminal.

When the control error of the monitoring target port does not exceed the certain threshold value (No in Operation S27), the failure determination unit 35 determines that the monitoring target port is normal, and ends the processing operation illustrated in FIG. 6. When the time period in which the abnormality in the monitoring target port has continued does not exceed the certain time period (No in Operation S30), the failure determination unit 35 ends the processing operation illustrated in FIG. 6.

The CPU 15 that executes the evaluation processing illustrated in FIG. 6 sets an unused port as a monitoring target port, outputs a monitoring signal to the monitoring target port, calculates a control error between the actual output level and the estimated output level for each of the monitoring target ports, and estimates an abnormality in the monitoring target port when the control error exceeds the certain threshold value. As a result, the CPU 15 may predict an abnormality in each of the monitoring target ports.

The CPU 15 accurately identifies an abnormality in the monitoring target port, and identifies a failure in the first WSS 11 by executing the processing in which whether a time period in which the abnormality in the monitoring target port has continued exceeds the certain time period is determined. The CPU 15 may identify an abnormality in the monitoring target port with high accuracy.

When the time period in which the abnormality in the monitoring target port has continued exceeds the certain time period, the CPU 15 identifies the abnormality in the monitoring target port with high accuracy, and outputs a failure alarm for the first WSS 11 to the monitoring terminal. The user of the monitoring terminal may recognize a failure in the first WSS 11 through the failure alarm, and recognize a replacement time of the first WSS 11.

The CPU 15 specifies an unused output port 11C from among the plurality of output ports of the first WSS 11 as a monitoring target port, sets a certain ATT amount to the specified monitoring target port, and outputs a monitoring signal to the monitoring target port to which the certain ATT amount has been set. The CPU 15 determines an abnormality in the monitoring target port, based on the output level of the monitoring signal at the monitoring target port and the estimated output level of the monitoring signal at the time of setting of the certain ATT amount. An abnormality such as performance reduction caused by a change over time in an unused port of the first WSS 11 or the like may be predicted.

The CPU 15 calculates the output level at the monitoring target port as the estimated output level, based on the certain ATT amount and the input level of the monitoring signal at the second input port 11B. The CPU 15 estimates an abnormality in the monitoring target port, based on the control error between the output level at the monitoring target port and the estimated output level. An abnormality such as a performance reduction caused by a change over time in an unused port of the first WSS 11 or the like may be predicted.

The CPU 15 calculates the control error of the monitoring target port at certain intervals, determines an abnormality in the monitoring target port when the control error exceeds the certain threshold value, and determines, when a time period in which the abnormality in the monitoring target port has continued exceeds the certain time period, that there is a high probability of the abnormality in the monitoring target port and there is a failure in the first WSS 11. The abnormality in an unused port of the first WSS 11 may be predicted with high accuracy, so that the failure in the first WSS 11 may be predicted. The CPU 15 outputs a failure alarm to the monitoring terminal when the failure in the first WSS 11 has been determined. The user may recognize the failure in the first WSS 11 through the failure alarm and recognize a replacement time of the first WSS 11.

The CPU 15 outputs a monitoring signal to the unused port of the first WSS 11, and estimates an abnormality in the unused port using the output level of the monitoring signal at the unused port or the like. The normality of an optical component such as the OCM 14 or the level monitoring unit 22 that monitors the output level may be checked in addition to the first WSS 11 and an unused port of the first WSS 11.

Whether the control error of the monitoring target port exceeds the certain threshold value is determined, and an abnormality in the monitoring target port is estimated when the control error exceeds the certain threshold value, and here, the estimation timing of an abnormality in the monitoring target port is changed as appropriate by changing the certain threshold value as appropriate.

Whether the time period in which an abnormality in the monitoring target port has continued exceeds the certain time period is determined, and the abnormality in the monitoring target port is estimated with high accuracy when the time period in which the abnormality in the monitoring target port has continued exceeds the certain time period, and here, the estimation timing of an abnormality in the monitoring target port is changed as appropriate by changing the certain time period as appropriate.

A failure in the first WSS 11 is determined when the time period in which the abnormality in the monitoring target port has continued exceeds the certain time period. For example, control error data of the monitoring target port is accumulated over a certain portion of time, and an abnormality in the monitoring target port or a failure in the first WSS 11 may be determined when the accumulated control error data exceeds a certain first threshold value.

The control error data of the monitoring target port is accumulated over a certain time period, the accumulated control error data is averaged over the certain time period, and an abnormality in the monitoring target port or a failure in the first WSS 11 may be determined when the average value exceeds a certain second threshold value.

An abnormality in the first WSS 11 is determined when the time period in which the abnormality in the monitoring target port has continued exceeds the certain time period, and here, a failure in the first WSS 11 may be determined a time period in which abnormalities of the plurality of monitoring target ports have continued exceeds the certain time period.

The first WSS 11 includes the first input port 11A through which an operating optical signal is input and the second input port 11B through which a monitoring signal is input. As the monitoring signal, an optical signal having an optical wavelength different from the operating optical signal is employed, so that crosstalk to the operating optical signal by the monitoring signal may be reduced.

For example, in consideration of the crosstalk to the operating optical signal by the monitoring signal, an optical wavelength different from the operating optical signal is set to the monitoring signal. Under an environment in which the crosstalk is not considered in the first WSS 11, the wavelength of the monitoring signal may be substantially the same as the wavelength of the operating optical signal.

All or some of the configuration elements of the units illustrated in the figures may be dispersed or integrated functionally or physically in a unit of a certain group depending on various loads, usage statuses, and the like.

All or some of the various processing functions executed in the devices may be executed on a central processing unit (CPU) (or a microcomputer such as a micro processing unit (MPU) or a micro-controller unit (MCU)). All or some of the various processing functions may be executed on a program analyzed and executed by the CPU (or the microcomputer such as the MPU or the MCU) or hardware by wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical wavelength multiplexing device comprising:
    a wavelength selective switch that includes a first input port through which an optical signal is input, a second input port through which a monitoring signal corresponding to a monitoring optical signal is input, a plurality of output ports through which the optical signal or the monitoring signal is output, and an adjuster that adjusts a level of the optical signal or the monitoring signal output to one of the plurality of output ports;
    a monitor that measures an output level of the monitoring signal at one of the plurality of output ports; and
    a controller that controls the wavelength selective switch and the monitor;
    wherein the controller:
        specifies an unused output port from among the plurality of output ports as a monitoring target port;
        sets an adjustment amount of the monitoring target port at a specific adjustment amount;
        outputs the monitoring signal to the monitoring target port; and
        determines whether the monitoring target port has an abnormality, based on the output level of the monitoring signal at the monitoring target port, which is measured by the monitor, and an estimated output level of the monitoring signal at the monitoring target port when the specific adjustment amount is set,
    wherein the monitoring target port is specified by the controller at specific intervals.

2. The optical wavelength multiplexing device according to claim 1, wherein the controller calculates the estimated output level at the monitoring target port, based on an input level of the monitoring signal at the second input port and the specific adjustment amount.

3. The optical wavelength multiplexing device according to claim 1, wherein whether the monitoring target port has an abnormality is determined, based on a difference between the output level of the monitoring signal at the monitoring target port, which is measured in the monitor, and the estimated output level at the monitoring target port.

4. The optical wavelength multiplexing device according to claim 3, wherein the controller monitors a time period in which the abnormality in the monitoring target port continues, and determines a failure in the wavelength selective switch when the time period in which the abnormality in the monitoring target port continues exceeds a certain time period.

5. An optical transmission device comprising:
    a first wavelength selective switch that includes a first input port through which a first optical signal is input, a second input port through which a monitoring signal corresponding to a monitoring optical signal is input, a plurality of first output ports through which the first optical signal or the monitoring signal is output, a first adjuster that adjusts a level of the first optical signal or the monitoring signal output to one of the plurality of output ports;
    a plurality of first optical dividers that are coupled to the respective first output port and divide the first optical signal or the monitoring signal;
    a monitor that measures an output level of the monitoring signal at one of the plurality of first output ports, which is divided by the respective first optical dividers; and
    a controller that controls the first wavelength selective switch and the monitor,
    wherein the controller:
        specifies an unused output port from among the plurality of first output ports as a monitoring target port, sets an adjustment amount of the monitoring target port at a specific adjustment amount;
        outputs the monitoring signal to the monitoring target port; and
        determines whether the monitoring target port has an abnormality, based on the output level of the monitoring signal at the monitoring target port, which is measured by the monitor, and an estimated output level of the monitoring signal at the monitoring target port when the specific adjustment amount is set,
    wherein the monitoring target port is specified by the controller at specific intervals.

6. The optical transmission device according to claim 5 further comprising:
    a second wavelength selective switch that includes a third input port through which a second optical signal is input, a second output port through which the second optical signal is output; and
    a second adjuster that adjusts a level of the second optical signal output to the second output port.

7. The optical transmission device according to claim 5 further comprising:
    a second optical divider that is coupled to the second output port and divides the second optical signal, wherein an output level of one of the divided second optical signals is measured by the monitor.

8. The optical transmission device according to claim 5, wherein the controller calculates the estimated output level at the monitoring target port, based on an input level of the monitoring signal at the second input port and the specific adjustment amount.

9. The optical transmission device according to claim 5, wherein whether the monitoring target port has an abnormality is determined, based on a difference between the output level of the monitoring signal at the monitoring target port, which is measured in the monitor, and the estimated output level at the monitoring target port.

10. The optical transmission device according to claim 9, wherein the controller monitors a time period in which the abnormality in the monitoring target port continues, and determines a failure in the first wavelength selective switch when the time period in which the abnormality in the monitoring target port continues exceeds a certain time period.

11. An abnormality determination method comprising:
    receiving an optical signal at a first input port;
    receiving a monitoring signal corresponding to a monitoring optical signal at a second input port;
    outputting the optical signal or the monitoring signal through a plurality of output ports;
    adjusting a level of the optical signal or the monitoring signal output to one of the plurality of output ports;
    measuring an output level of the monitoring signal at one of the plurality of output ports;
    specifying an unused output port from among the plurality of output ports as a monitoring target port;
    setting an adjustment amount of the specified monitoring target port at a specific adjustment amount;
    outputting the monitoring signal to the monitoring target port; and
    determining whether the monitoring target port has an abnormality, based on the measured output level of the monitoring signal at the monitoring target port and the estimated output level of the monitoring signal at the monitoring target port when the specific adjustment amount is set,
    wherein the monitoring target port is specified by the controller at specific intervals.

12. The abnormality determination method according to claim 11, wherein the estimated output level at the monitoring target port is calculated based on an input level of the monitoring signal at the second input port and the specific adjustment amount.

13. The abnormality determination method according to claim 11, wherein whether the monitoring target port has an abnormality is determined, based on a difference between the output level of the monitoring signal at the monitoring target port and the estimated output level at the monitoring target port.

14. The abnormality determination method according to claim 13, further comprising:
    monitoring a time period in which the abnormality in the monitoring target port continues; and
    determining a failure in the wavelength selective switch when the time period in which the abnormality in the monitoring target port continues exceeds a certain time period.

* * * * *